Nov. 23, 1954  R. W. BARNS  2,695,304
OIL EXTRACTION AND DRYING PROCESS
Filed June 2, 1949
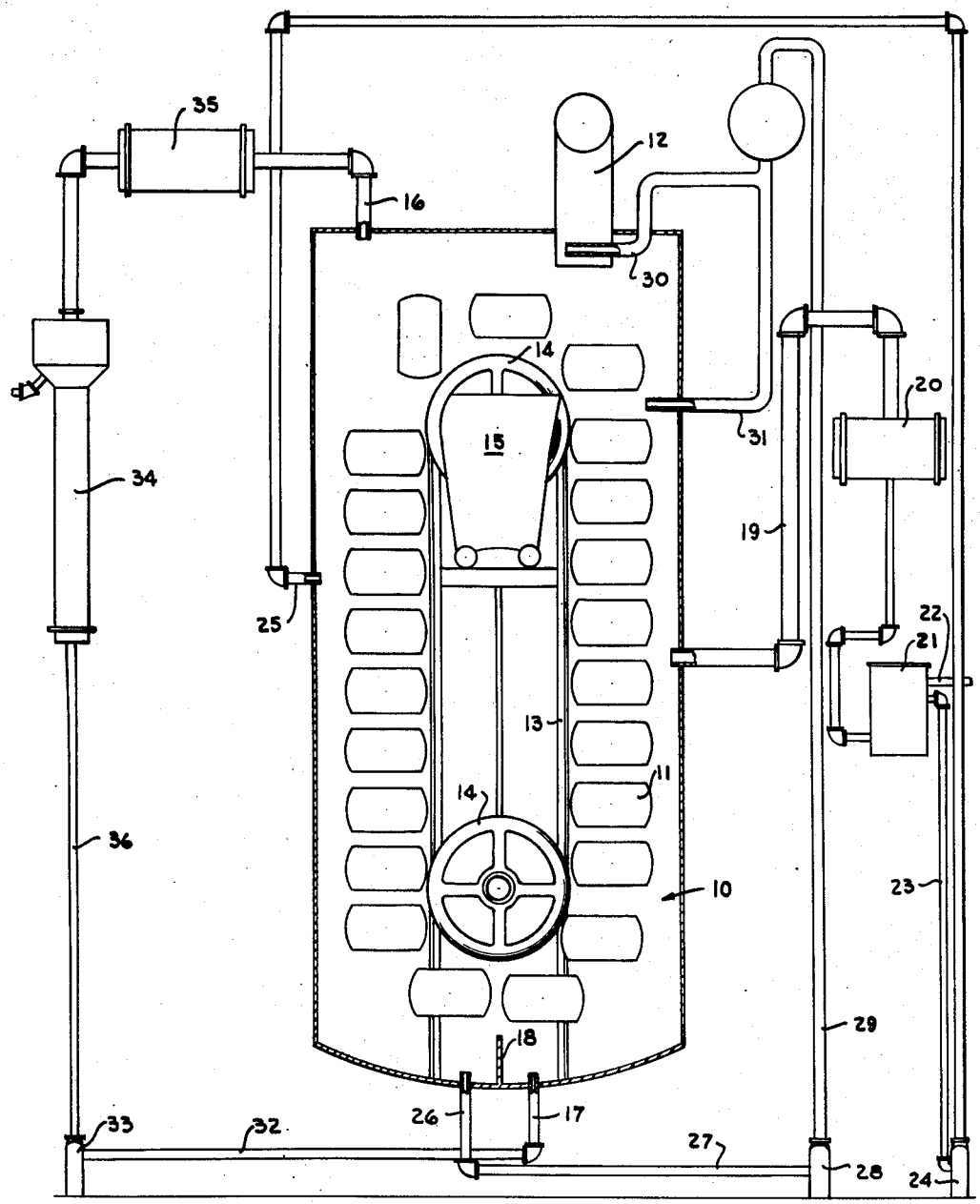
Inventor
ROY W. BARNS
By Arthur M. Smith
Attorney United States Patent Office 2,695,304
Patented Nov. 23, 1954

2,695,304

OIL EXTRACTION AND DRYING PROCESS

Roy W. Barns, Detroit, Mich., assignor to The French Oil Mill Machinery Company, Piqua, Ohio Application June 2, 1949, Serial No. 96,660

4 Claims. (Cl. 260—412.4)

This invention relates to a method of drying and oil extraction and more particularly to a method for extracting oils and other oleaginous materials from vegetable or animal matter, such as cottonseed, flax, soya beans, meat scraps, offal and similar materials.

It is well known that a great many vegetable and animal materials contain large amounts of valuable oleaginous matter. Previous to the present invention, it has been extremely difficult and in some cases impossible, to extract these valuable oleaginous materials. The methods previously attempted for the oil extraction have been uneconomic as the yields from such processes have been relatively low and the extraction has required long time periods to recover but a small amount of the total oil present.

Oleaginous materials usually contain a relatively large percentage of water. A considerable portion of such water is bound or entrapped within the particles of the material and, in some materials, such as meat scraps, it is bound within the cellular structure of the material.

Suitable solvents for oil extraction are water immiscible liquids. In order that the solvent may be compatible with the oil bearing material, it has previously been necessary to remove, as by evaporation, most of the water contained therein. However, removing the entrapped water particularly within a cellular structure, has proven too costly and in some cases such temperatures are required which are both injurious to the oil and also to the coil containing material. It has frequently been found that when material such as meat scrap is heated to a temperature sufficient to effect sufficient drying thereof, the cellular structure is so changed that it becomes increasingly difficult as the extraction proceeds to extract appreciable amounts of the residual oleaginous material disposed within the changed cellular structure.

Even with a relatively dry oleaginous material the diffusion rate of the liquid oil solvent is slow and the extent of diffusion is limited by the porosity of the material being extracted. Previous methods have attempted to overcome this difficulty by grinding or pulverizing the material to a relatively fine mesh prior to the actual extraction step. While with this procedure the oil solvent may more quickly and completely diffuse throughout the oleaginous material, with most materials an excessive quantity of powder or "fines" is formed. In the prior processes in which the material is flooded with solvent, the "fines" are carried by the solvent and oil therein. The extracted oil must be separated from the solvent, such as by filtration. With most materials the "fines" have presented a major problem during the filtration operation and have made these previous extraction methods expensive, and unsatisfactory for extracting the oil from a large number of oil bearing materials.

In prior extraction processes wherein a liquid solvent is percolated through the oil containing material, the solvent or miscella accumulates the "fines" as it steeps downward through the material and forms, within the extracted, dried material, a non-porous filter bed or interface which prevents further percolation of solvent through the material and thus prevents further extraction.

In the prior process wherein the oil containing material is not completely dried prior to the extraction step, the percentage of water within the material increases as the oil content decreases. The oil-free material is then passed to a desolventizer to remove the solvent therefrom. For an economical process, it is necessary to recover substantially all of the solvent for recycling in the system and also to obtain a substantially solvent-free meal or crax for commercial by-products. Previous extraction processes required an excessive amount of heat to volatize both the water and the liquid solvent in the desolventizing operation due to the relatively high latent heat of water. Using steam to strip the liquid from the material has caused the formation of glue or so-called "plugs" which plugged the drier and prevented further operation of the desolventizing apparatus.

Various water immiscible solvents have been used with the above methods with substantially the same results. Consequently, a solvent has generally been employed which has provided a maximum solvent economy. There has been no particular relation between the type of solvent used and the type of material being extracted.

It is therefore an object of this invention to provide a method for extracting oleaginous matter from oleaginous material in which pre-drying of the raw material is unnecessary and in which the material may be dried and the oleaginous matter extracted simultaneously.

Another object of the invention is to provide a method whereby both the rate and extent of diffusion of the oleaginous solvent is substantially increased.

Still another object is to provide a method of the above type in which the solvent is brought in contact with substantially all of the oil contained in the material including the oil which is normally bound or entrapped within minute particles or within the cellular structure thereof and in which the miscella may be drained substantially free from "fines."

Another object is to provide a method which is adapted to continuous or batch extraction.

Still another object of the invention is to provide an economical and efficient extraction method which is characterized by a relatively high extraction rate.

Another object of the invention is to provide a method in which large amounts of water are vaporized or evaporated from the oil containing material and large amounts of oil are extracted therefrom with a relatively low volume of liquid solvent.

Another object of this invention is to provide an oil extraction and drying method which entirely eliminates the necessity of removing water during the desolventizing operation and thus makes this step of the process substantially more economical and efficient.

Other objects of this invention will appear in the following description and appended claims, reference being had to the accompanying drawings forming a part of this specification wherein like reference characters designate corresponding parts in the several views.

Fig. 1 is a schematic elevational view partly in section showing suitable apparatus for carrying out the method of the present invention.

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In accordance with the present invention, the extraction process is carried out by contacting the material to be extracted with hot, water free, vapors of an organic solvent for the oleaginous material, which is immiscible with water, and which is capable of forming therewith, upon distillation, a vapor mixture of solvent and water of substantially constant composition, that is to say, an azeotrope. The term, "azeotrope forming solvent," or the term "solvent," as hereinafter employed, is therefore to be understood to define a solvent having these properties. The mechanics of the extraction process is thus governed by the well known phase rule wherein the number of phases of the system plus the number of conditions that must be used to define the system, such as pressure, temperature and composition, must be equal to the number of components of the system plus 2. It may therefore be seen that in operating under azeotropic conditions, the system will not attain equilibrium at any given temperature until the azeotropic, gaseous medium attains a value which satisfies the phase rule.

According to the present invention, hot water-free solvent vapors are continuously brought in contact with the oleaginous material. Due to the water present within the latter material a substantially constant-boiling point azeotropic mixture tends to form between the water and the water immiscible solvent vapors. A quantity of solvent vapor condenses on the material liberating its latent heat to effect vaporization of the water and to maintain a heat balance within the system. In order to prevent equilibrium the azeotropic mixture is continuously removed from the system and replaced by water-free solvent vapors.

Thermally, the amount of hot solvent vapors required to vaporize a unit weight of $H_2O$ is the ratio of latent heat of the solvent and water. However, the actual amount of solvent vapor that must be provided is greater than this quantity since the process would stop as soon as the vapor reached azeotropic composition. Weight of the solvent required to vaporize a unit weight of water is equal to the weight of the water times the latent heat of the water divided by the latent heat of the solvent, plus the weight of the water times the vapor pressure of the solvent, times the molecular weight of the solvent divided by the vapor pressure of the water times the molecular weight of the water. In other words:

$$\text{Wt. of solvent} = \frac{\text{Wt. } H_2O \times \text{latent ht. of } H_2O}{\text{latent heat of solvent}} +$$

$$\frac{\text{Wt. } H_2O \times \text{vapor press. of solvent} \times \text{mol. wt. of solvent}}{\text{vapor press. of } H_2O \times \text{mol. wt. of } H_2O}$$

This latter factor is commonly called the steam distillation ratio.

The azeotropic mixture and any excess solvent vapors which are removed from the system are preferably cooled or otherwise processed to remove the water content contained therein and the solvent recycled through the system.

The miscella containing the extracted oil may be continuously drained from the system and passed through a separator to recover the extracted oil. Preferably the liquid solvent recovered during this separation is also recycled through the system.

While the above process has been found highly satisfactory, it is frequently desirable to simultaneously spray the material being extracted with liquid solvent to assist in mechanically removing the oil extracted by the condensed solvent vapors. However, the amount of liquid solvent sprayed over the material must be controlled to prevent flooding of the material and thus prevent the "fines" contained in the latter from draining out of the system with the miscella.

A suitable apparatus for carrying out the methods of the present invention is shown schematically in the drawings. The extraction chamber 10 is provided with a plurality of perforated baskets 11 adapted to contain the material to be extracted. The oleaginous material is inserted into the basket 11 through the feed mechanism 12 positioned adjacent the top of the extraction chamber.

The baskets 11 are mounted on an endless belt mechanism 13 which is movable within the extraction chamber about the revolving wheels 14 as is schematically shown in the drawing. Each basket remains in a substantially horizontal position as it travels to the bottom of the chamber and back to the top thereof. Upon completion of substantially one cycle the oil bearing material is dumped or otherwise removed from the baskets into the hopper 15. The hot solvent vapors enter the extraction chamber through the inlet 16. The hot water-free vapors diffuse downwardly in the chamber through the oil bearing materials in the perforated baskets. The miscella which drains from the material in the baskets 11 is drained from the system through the outlet port 17. As shown in the drawings, a partition 18 is preferably employed to separate the relatively concentrated miscella coming from the relatively fresh oleaginous material in the baskets shown on the right of the extraction chamber from the relatively weak miscella coming from the baskets moving upwardly in the extraction chamber.

The excess solvent vapors and the azeotropic mixture formed within the extraction chamber are continuously removed from the system through the outlet pipe 19. This gaseous medium is led into a condenser 20 and thence to a suitable separator 21. The excess water is removed from the separator through the outlet 22 and the solvent phase is removed from the separator through the pipe 23 extending to a pump 24 adapted to recycle the condensed solvent. As shown in the drawings, the solvent is preferably sprayed over the oleaginous material through the pipe 25 and is drained from the extraction chamber through the outlet 26.

The weak miscella coming from the outlet 26 passes through the pipe 27 to the pump 28. The miscella is then pumped through the pipe 29 to the top of the extraction chamber and sprayed over the fresh oleaginous material entering the extraction chamber through the inlet pipes 30 and 31. The concentrated miscella which passes through the outlet 17 and thence through the pipe 32 to the pump 33 is piped to an evaporator 34 through the pipe 36. The solvent vapors recovered in the evaporator are then recycled through the system after passing through the super heater 35.

In extracting oleaginous material in accordance with the present invention, the phase rule may be judiciously employed to ascertain the most desirable operating conditions and type of solvent for the particular material being extracted. For example, it should be apparent that the solvent vapors entering the chamber should be maintained at a temperature approximating the boiling temperature of the solvent. Under these conditions, the bulk of the heat transferred in the system is in the form of latent heat rather than merely sensible heat. Accordingly, a relatively large amount of drying and extracting is accomplished for a given volume of solvent vapors.

The rate, economy and degree of drying or extraction depends on a number of factors controlled to a large degree by phase rule considerations.

The rate of drying and extraction is governed by the drying gradient or drying potential which exists between the material and the vapor. This gradient is zero when the vapor is azeotropic in composition and maximum when the vapor is water-free. Solvents with low steam distillation ratios will give more rapid drying or extraction since they require relatively large proportions of water to satisfy their azeotropes.

The rate of extraction will be enhanced by the use of solvents with low latent heats since more solvent is deposited in the material for each unit of water removed.

Thermal economy of the process is governed by a combination of the steam distillation ratio and the latent heat of the solvent.

Low steam distillation rates mean that less solvent by weight goes out of the system for each unit of water removed.

Low latent heat means that the above-mentioned solvent carries out less heat as waste from the system.

Degree of drying, particularly where hygroscopic materials are involved is set by the temperature difference between the azeotropic and normal boiling points. Lowest moisture contents in the product are expected when this temperature difference is greatest. This is because the partial pressure of water is lowered by the hygroscopic characteristics of the material. In order to satisfy azeotropic conditions the temperature of the material rises to supply the required vapor pressure. When the material temperature approaches the boiling temperature of the solvent, heat transfer by condensation ceases.

Where the material must be reduced to very low oil contents and extraction by diffusion is unusually important, the degree of extraction parallels the degree of drying.

Degree of extraction is enhanced by the use of solvents with low latent heats since more solvent is deposited in the material for each unit of water removed.

Upon determining the maximum desirable operating temperature for the system, dependent upon the nature of the material being extracted, the most desirable solvent may be selected for the extraction process which has a boiling point below the desired operating conditions, with due regard to the best combination of the following:

1. Maximum difference between the normal and azeotropic boiling points.
2. Lowest steam distillation ratio possible.
3. High or low latent heat in the solvent, dependent upon the heat economy desired in the process or the degree of drying or extraction desired. With a high latent heat solvent, the thermal economy is relatively low and the degree of drying is high relative to the amount of oil extraction.

In operating in accordance with the present invention, and employing in the system only the heat transferred from the hot solvent vapors, the rate of flow of the substantially water-free solvent vapors into the system is controlled to control the temperature of the azeotropic gaseous medium leaving the system. Preferably, rate of flow into the system of the solvent vapors is regulated to maintain the outlet gas at a temperature approximating the azeotropic boiling point of the particular solvent being employed, generally from 15 to 25° F. above the normal boiling point of the azeotrope. The rate of drying and extracting is increased by allowing the azeotropic gas to leave at a somewhat higher temperature. However, the thermal economy of the process is reduced at higher outlet gas temperatures.

In drying or extracting in a batch process, the temperature of the outlet gaseous medium is maintained at or slightly above the azeotropic boiling point of the solvent until substantially all of the water in the material has been vaporized. In the latter stages of the operation when only a relatively low hygroscopic water content remains in the material being dried, the temperature of the outlet gases is normally allowed to rise somewhat to increase the drying and extraction rate or potential of the solvent in order to continue the transfer of heat from the solvent vapors as latent heat and not merely as sensible heat. The temperature of the outlet gases is, in fact, a measure of the water content of the outlet gases. At the azeotropic temperature, the gases contain a maximum water content. At higher temperatures, the water content of the outlet gases is proportionately lower, thus increasing the water vapor pressure gradient of the gaseous medium and of the liquid water remaining in the material being dried is increased. It should be apparent that by effecting complete drying of the material, substantially all of the oil contained therein is extracted by the liquid solvent which is condensed by virtue of the water vaporization.

It is not necessary to flood the oil bearing material with solvents in order to get maximum oil extractions when utilizing the process of the present invention. Thus, even a large percentage of "fines" normally found in materials such as cottonseed presents no appreciable problem during the oil extraction. Even when extracting oil from extremely fine materials, the miscella discharged from the bed has been clear and brilliant.

In extracting according to the present invention, extraction rates have been greatly increased. The rate of extraction is largely dependent upon the rate of diffusion of the solvent throughout the material being extracted. In prior methods, it was attempted to increase the diffusion rate by subdividing the material to be extracted into thin flakes and using high solvent temperatures. Operating under the azeotropic conditions of the present invention, the solvent diffusion rate is increased many times over the diffusion rate of prior processes.

The present process is substantially more economical due to: (1) the elimination of a separate drying step for the material to be extracted; (2) the increased rate of diffusion of the solvent throughout the material being extracted; (3) the more complete extraction of the oil from the material; (4) the more efficient heat transfer in the process by the use of latent heat of the solvent; and (5) by the provision of a process wherein the most advantageous and economical solvent may be determined.

The solvents which have been found particularly suitable for the present invention have been trichlorethylene, perchlorethylene, hexane and heptane. The invention is not limited to these solvents however, since any suitable water immiscible solvent may be employed which provides the most advantageous operating conditions for the particular material being extracted.

The miscella tends to seep downwardly by gravity through the material being extracted. For this reason it has been found preferable to pass the water-free hot solvent vapors downwardly in order that the driest solvent vapors are in contact with material having the lowest oil content. These relatively dry vapors diffuse more readily into the smallest of particles and into the cellular structure of the material to effect maximum oil extraction therefrom. Thus, the material being extracted is, in effect, progressively extracted from the upper to the lower surface thereof.

In extracting oleaginous materials in accordance with the invention of the present application, it is apparent that the material is dried and the oil extracted therefrom simultaneously. The water present within the materials to be extracted is no longer a hindrance, but is instead a necessary part of the present extraction process. The hygroscopic water which has been especially difficult to vaporize in prior methods is a decided advantage in the present invention since the relatively dry solvent vapors tend to seek out this water even within the cellular structure of the material and condense therein to effectively extract the entrapped oil or other oleaginous materials.

While the present invention has been discussed with particular regard to oil extraction, it should be apparent that the process may be effectively employed to merely dry a material such as wood or the like, or to degrease metals, such for example as metal chips. In employing the process as a drying or dehydration process, the water is removed economically and completely for the same reasons and in essentially the same way that the water was removed during oil extraction.

Having thus described my invention, I claim:

1. A method of drying a material having a quantity of water therein comprising the steps of confining the material in a closed chamber, introducing hot vapors of dry, water immiscible azeotrope forming solvent into the chamber and into contact with the material, condensing a portion of the vapors on the material, thereby to transfer latent heat from said vapor directly to the material, maintaining the material and solvent at a temperature between that of the boiling point of the pure solvent and its azeotrope with water, thereby to form a vapor mixture of water and solvent and extract water from the material, removing the said vapor mixture while in the vapor phase from the chamber while simultaneously admitting fresh quantities of hot solvent vapors to continue the elimination of water, removing from the chamber excess condensed solvent, and recovering the solvent in said removed vapor mixture.

2. A method of simultaneously dehydrating and extracting oil from material containing water and oil which comprises the steps of confining the material in a closed chamber, heating to boiling a water free and water immiscible azeotrope forming organic solvent exteriorly of the chamber, conducting the hot vapors of the solvent into the chamber and into contact with the material, supplying said hot vapors to the chamber in an amount and at a rate sufficient to condense a portion thereof on said material and maintain the same at a temperature above the condensation point of the azeotrope of the solvent with water thereby to transfer latent heat from said vapor directly to the material, thereby to volatilize the water, admixing with the water vapor a portion of the solvent vapor and withdrawing the mixture while in the vapor phase from the chamber, concurrently supplying additional quantities of hot solvent vapors to the chamber thereby to a maintain condensed solvent in contact with the material, draining the condensed solvent with oil therein from the material, withdrawing the mixture of oil and condensed solvent from the chamber for separation therebetween, and recovering the solvent in said removed vapor mixture.

3. The method as set forth in claim 2, further characterized by the step of spraying the material while in said chamber with controlled and limited amounts of solvent in quantity insufficient to flood the material and release substantial amounts of fines therefrom.

4. The method as set forth in claim 2, further characterized by the steps of condensing the withdrawn mixture of water and solvent vapors exteriorly of the chamber, separating the water from the immiscible solvent, and returning the separated solvent to its zone of heating.

References Cited in the file of this patent

UNITED STATES PATENTS

| Number | Name | Date |
|---|---|---|
| 1,503,751 | Dreymann | Aug. 5, 1924 |
| 1,504,588 | Tunison | Aug. 12, 1924 |
| 1,721,686 | Boykin | July 23, 1929 |
| 1,862,945 | Schlotterhose | June 14, 1932 |
| 2,097,147 | Dinley | Oct. 26, 1937 |
| 2,187,208 | McDonald | Jan. 16, 1940 |
| 2,225,799 | Robinson | Dec. 24, 1940 |